UNITED STATES PATENT OFFICE.

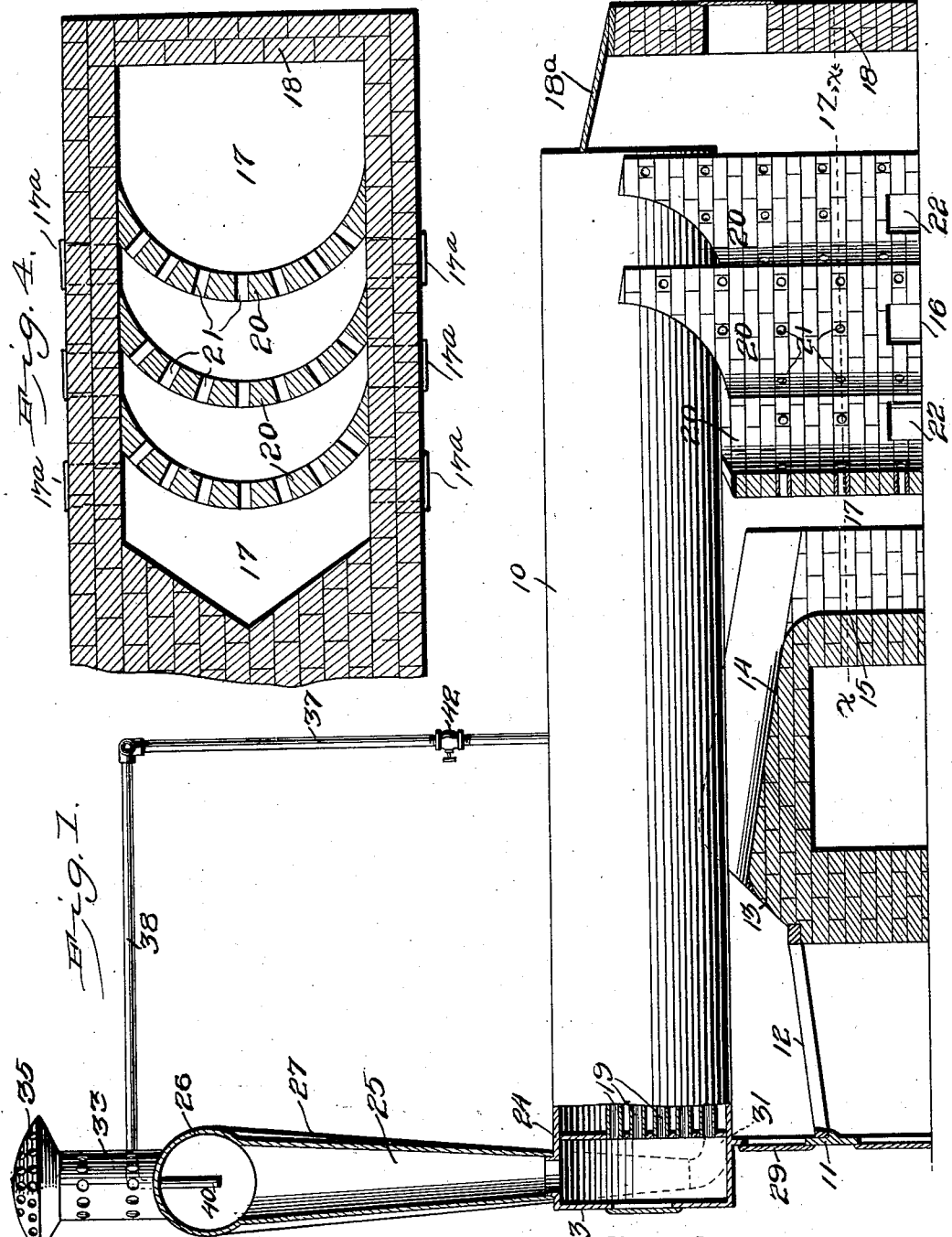

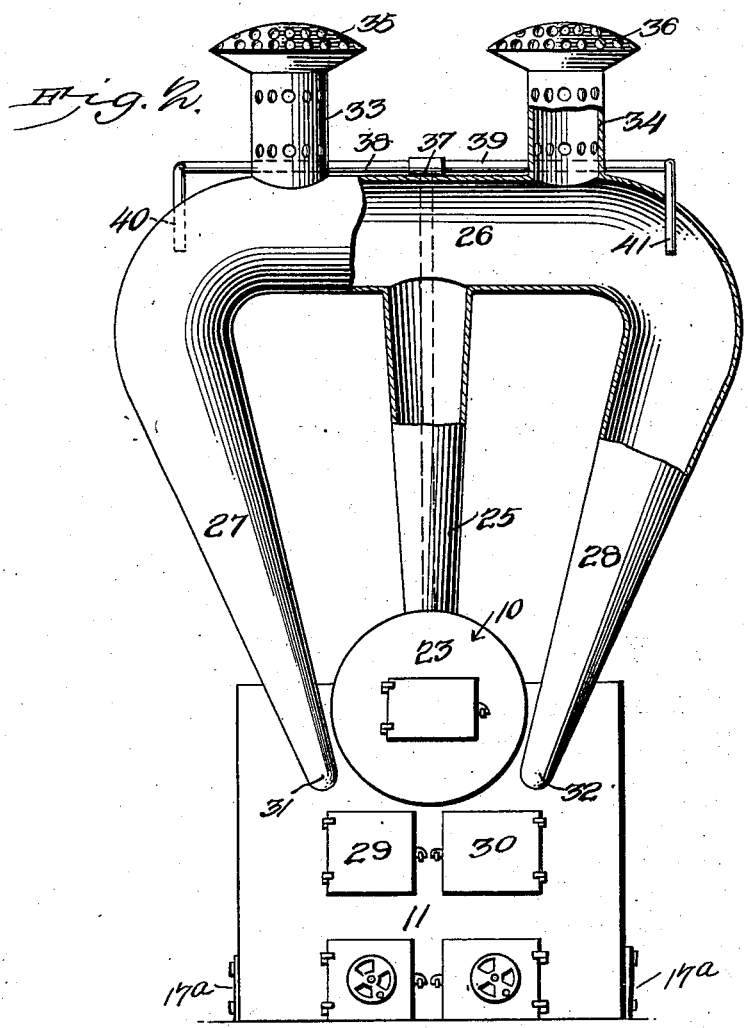
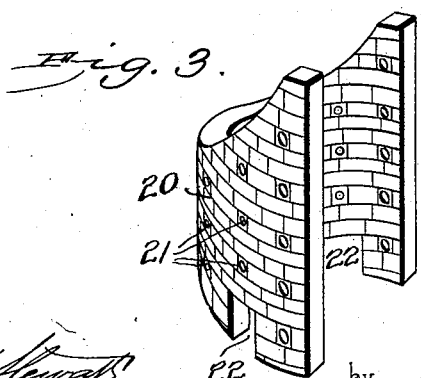

ERVIN W. BERRY, OF PADUCAH, KENTUCKY.

SMOKE-CONSUMING FURNACE.

SPECIFICATION forming part of Letters Patent No. 723,511, dated March 24, 1903.

Application filed April 5, 1902. Serial No. 101,568. (No model.)

*To all whom it may concern:*

Be it known that I, ERVIN W. BERRY, a citizen of the United States, residing at Paducah, in the county of McCracken and State of Kentucky, have invented a new and useful Smoke-Consuming Furnace, of which the following is a specification.

This invention has for its object the production of a furnace wherein all the combustible particles contained in the products of the combustion are consumed; and the invention consists, first, in a novel form of bridge or fire wall whereby the products of the combustion when first leaving the initial fire-chamber are brought into closer relations to the surface of the boiler and the particles of combustible matter more thoroughly commingled with the heated air, and thereby more thoroughly consumed.

The invention consists, secondly, in a supplementary fire-chamber between the fire-wall and the boiler in which the products of the combustion are caused to pass over and through a series of curved perforated deflecting-plates or retarding-walls, whereby the combustible particles which still remain in the products of the combustion are still further separated and subjected to the action of the consuming gases.

The invention consists, thirdly, in a novel form of the construction of the outlet-flues whereby the unconsumed combustible particles are finally precipitated and returned to the initial fire-chamber and the combustible gases only discharged from the final outlet.

Further novel features of the construction will appear in the annexed description and be specifically pointed out in the claims following.

The invention may be applied to the furnaces of either stationary or locomotive steam-boilers, kilns, heating apparatus, and other purposes for which furnaces are employed; but for the purpose of illustration it is shown in the drawings applied to an ordinary steam-boiler and furnace.

Figure 1 represents a horizontal section with the improvements applied. Fig. 2 is a front elevation, partially in section, of the same. Fig. 3 is a perspective view of one of the deflecting plates or walls in the supplemental fire-chamber detached. Fig. 4 is a horizontal section on the line $x\ x$ of Fig. 1.

The boiler is represented at 10, the furnace-front at 11, and the grate at 12 of the usual construction, the grate being preferably arranged inclining downward from the rear or bridge-wall end to the front or fire-door end to provide for the more easy removal of clinkers and ashes. The bridge-wall is formed inclined from the grate rearwardly and upwardly to a point comparatively near the bottom of the boiler, as shown at 13, and thence inclined downwardly and rearwardly, as at 14, and gradually curved downwardly into a vertical line, as at 15, to a horizontal plane (represented at 16) and which forms the bottom of a supplemental combustion-chamber 17, extending in the rear of the boiler and terminated by the rear wall or closure 18. The upper surface of the bridge-wall and the portion at 15 are concaved, as indicated, so that the products of the combustion passing over them are caused to roll over and over and be thereby more thoroughly commingled with the air, and consequently more thoroughly consumed, as hereinafter more fully explained. The rear wall 18 extends upwardly and is provided with a cover $18^a$, engaging the rear "head" of the boiler, as shown, and providing for conducting the products of the combustion into the flues 19 in the ordinary manner. The side walls of the "setting" form the side walls of both the initial fire-chamber and of the supplemental combustion-chamber, as indicated at $17^a$. All the parts of the bridge-wall and of the interior of the supplemental combustion-chamber with which the fire comes in contact will preferably be sheathed with fire-brick or other refractory material. The side walls of the supplemental chamber will preferably be perforated at intervals and the perforations covered by doors to provide for the removal of ashes from the chamber.

Within the supplemental chamber 17 are erected a series of vertical curved walls 20, preferably three or more, each having numerous comparatively small perforations 21 throughout and with larger apertures 22 through their lower sides. Each wall 20 extends nearly to the boiler 10 and is concaved in its upper side to conform to the curve of the shell of the boiler. These walls 20 serve to retard the products of the combustion and hold them for a longer period of time in the chamber 17 and by their curved form cause the material to pursue a multiplied zigzag course and very materially aid in the combustion and consequent increased consumption of the combustible particles. The walls 20, moreover, become very highly heated by the passage over them and through them of the fire, and consequently thereby aid materially in the combustion of the combustible particles, and by forming the walls in the curved lines the area of these very desirable highly-heated surfaces is materially increased and the efficiency of the device correspondingly increased. The curving of the walls 20 is therefore an important feature of the invention and adds very materially to the efficiency of the device. The concave form of the upper and rear surfaces 14 and 15 of the bridge-wall is also an important feature, as the products of the combustion are caused thereby to roll over and over as they pass over the concave surfaces and are thereby more thoroughly commingled with the highly-heated air carried along from the initial combustion-chamber above the grate 12, which aids materially in their combustion. The surfaces of the bridge-wall exposed to the fire, like the exposed surfaces of the walls 20, become highly heated, and thereby aid materially in consuming the refractory particles, and to this end the concave form of the exposed surfaces materially increases the heating-surface thus exposed and correspondingly increases the efficiency and coacts with the curved walls 20 to more thoroughly consume the combustible and refractory particles in the products of the combustion.

The smoke-arch 23 is formed in the usual manner over the front head 24 of the boiler 10, and from its center rises the main discharge-flue 25, as shown. This flue 25 is tapered outwardly or enlarged upwardly and terminates in an enlarged transverse head-flue 26, from whose ends depend branch flues 27 28, tapered downwardly and terminating in the initial fire-chamber above the grate 12 on each side of the feed-doors 29 30, where they are provided with discharge-nozzles facing in the direction of the inclined front portion of the bridge-wall, as will be understood by reference to Figs. 1 and 2 of the drawings, where said nozzles are indicated at 31 32, thereby accelerating the draft, a feature which I have found to be of great importance—in fact, indispensable in the successful operation of the device when the plurality of curved draft-retarding walls, which also form an essential element of my invention, are employed. Leading upward from the transverse head 26 are gas-escape branches 33 34, each provided with numerous perforations and each having perforated caps 35 36.

Connected into the boiler 10 is a steam-pipe 37, leading upward and provided with lateral branches 38 39 terminating in downwardly-discharging nozzles 40 41 centrally disposed in the depending flues 27 28, so that jets of steam may be projected downward into the flues 28 29. A controlling-valve 42 will be connected into the pipe 37 to regulate the amount of the steam passing through the pipe.

When thus constructed and assembled, the products of the combustion which are not intercepted by the retarding-walls nor consumed in the supplemental fire-chamber, which will consist of the refractory gases, and lighter and more refractory particles of the combustible material, will pass through the flues 19 and rise into the discharge-flue 25, where they will expand into the constantly-enlarging flue and pass thence into the enlarged transverse head-flue 26. In the meantime, the valve 42 having been opened, jets of steam are forced downward through the nozzles 41 42, serving as "steam-blowers" to create a strong downward draft through the flues 27 28, which causes the greater mass of the products of the combustion which has entered the flue 26 to be forcibly drawn into the flues 27 28 and driven into the initial fire-chamber. This action leaves nothing to pass the final discharge branches 33 34 but a comparatively small amount of incombustible volatile gases. By this means nothing of a combustible nature can escape from the furnace, but every particle which is susceptible to the influence of heat is consumed, and nothing escapes but the volatile gases, while the heavier particles of combustible matter, such as ashes, is precipitated in the supplemental chamber 17 between the walls 20, from which it will be removed by the side doors, as before mentioned. By gradually enlarging the flue 25 the products of the combustion gradually expand into the enlarged head 26, and thus more freely release the separable particles and the volatile refractory gases. Then by converging the downwardly-extending branches 27 28 the material is gradually compressed and drawn into the initial fire-chamber with accelerated force, and thereby adds materially to the draft of the furnace and requires less of direct draft through the ash-pit beneath the grate. The steam-jets commingling with the highly-heated air in the flue branches 27 28 produce a highly inflammable gas, which adds materially to the heat of the fire on the grate and effects a great saving of fuel.

I desire to state that I am quite aware that, broadly considered, it is by no means new to return the products of combustion to the fire-chamber for the purpose of subjecting them to a second and more complete incineration, and I am also aware that it is customary to assist or compel such return of the unconsumed products either by mechanical means or by jets of steam, hot air, or the like. Indeed, a great variety of devices have been constructed with these ends in view. Such means I do not broadly claim. Reference to the foregoing parts of this specification, however, will show the purpose of the special construction of the flue members, whereby the products are taken from the smoke-chamber or smoke-arch at the front end of the boiler and returned direct to the fire-box of the furnace. I now wish to state that in connection with these parts of my improved device the bridge-walls and draft-retarding walls are of no little importance, the said walls, especially the retarding-walls, serving in a very efficient manner to intercept ashes, cinders, and all heavier products of combustion, which if not thus intercepted would be liable not only to lodge in the flues, but also to be carried through the latter to the smoke-arch and return-flues, where they will soon settle in sufficient quantities to interfere with the successful operation of the device, especially in view of the fact that the final escape of products of combustion is checked by the perforated cowls or caps which cover the exit-openings. It will thus be seen that all of these parts distinctly coöperate with each other to produce a new and useful result.

Having thus described my invention, what I claim is—

1. In a smoke-consuming furnace having a bridge-wall and a plurality of curved draft-retarding walls, an upwardly-flaring flue rising from the smoke-chamber, a transverse head-flue connected with the upper end of said flaring flue, downwardly-tapered flues connected with the ends of said head-flue and discharging into the initial fire-chamber, and steam-jets discharging into the upper ends of said downwardly-tapered flues, substantially as set forth.

2. A smoke-consuming furnace having a bridge-wall and a plurality of draft-retarding walls, combined with a boiler, a smoke-chamber at the front end of said boiler and means for returning products of combustion not consumed at the time of their discharge from the smoke-chamber to the initial fire-chamber, substantially as set forth.

3. A smoke-consuming furnace having a bridge-wall, a plurality of curved draft-retarding walls, a boiler having return-flues, a smoke-chamber at the front end of said boiler, means for returning products of combustion unconsumed at the time of their discharge from the smoke-chamber to the initial fire-chamber, and steam-jets discharging into the return-flues connected with the fire-chamber to accelerate the draft and assist in the combustion, substantially as set forth.

4. In a smoke-consuming furnace having a bridge-wall and a plurality of draft-retarding walls, a boiler, a smoke-chamber at the front end of said boiler, an upwardly-flaring flue rising from the smoke-chamber, a transverse head-flue connected with the upper end of said flaring flue, return-flues connecting said head-flue with the initial fire-box, means for causing the products of combustion to flow through the return-flues to said fire-box, and outlets covered with perforated caps connected with the head-flue, substantially as set forth.

5. In a smoke-consuming furnace, an upwardly-flaring flue rising from the smoke-chamber, a transverse head-flue connected with the upper end of said flaring flue, downwardly-tapered return-flues connecting said head-flue with the initial fire-chamber and discharging into the latter rearwardly in the direction of the bridge-wall, and steam-jets discharging into the upper ends of said return-flues, substantially as set forth.

In testimony that I claim the foregoing as my own I have hereto affixed my signature in the presence of two witnesses.

ERVIN W. BERRY.

Witnesses:
W. T. LEDFORD,
S. S. MIZELL.